United States Patent
Hafner et al.

(10) Patent No.: US 9,581,037 B2
(45) Date of Patent: Feb. 28, 2017

(54) SEALS WITH COOLING PATHWAYS AND METERED COOLING

(71) Applicant: General Electric Company, Schenectady, NY (US)

(72) Inventors: Matthew Troy Hafner, Greenville, SC (US); Victor John Morgan, Greenville, SC (US); Jacob John Kittleson, Greenville, SC (US); Neelesh N. Sarawate, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/697,765

(22) Filed: Apr. 28, 2015

(65) Prior Publication Data
US 2016/0319685 A1 Nov. 3, 2016

(51) Int. Cl.
| | |
|---|---|
| F16J 15/02 | (2006.01) |
| F01D 11/00 | (2006.01) |
| F01D 25/12 | (2006.01) |
| F02C 7/18 | (2006.01) |
| F16J 15/06 | (2006.01) |

(52) U.S. Cl.
CPC ............ *F01D 11/005* (2013.01); *F01D 25/12* (2013.01); *F02C 7/18* (2013.01); *F16J 15/064* (2013.01); *F05D 2220/32* (2013.01); *F05D 2240/55* (2013.01); *F05D 2260/20* (2013.01)

(58) Field of Classification Search
CPC .... F16J 15/064; F05D 2240/55; F01D 11/005
See application file for complete search history.

(56) References Cited

U.S. PATENT DOCUMENTS

| | | | |
|---|---|---|---|
| 7,172,201 B2* | 2/2007 | Uhrner | F16J 15/3228 277/551 |
| 2012/0189435 A1 | 7/2012 | Morgan et al. | |
| 2013/0028713 A1 | 1/2013 | Giri et al. | |
| 2013/0106066 A1* | 5/2013 | Sarawate | F16J 15/128 277/641 |
| 2013/0108420 A1* | 5/2013 | Morgan | F16J 15/122 415/182.1 |
| 2014/0062032 A1* | 3/2014 | Wolfe | F16J 15/128 277/590 |

(Continued)

FOREIGN PATENT DOCUMENTS

| | | |
|---|---|---|
| EP | 2 716 876 A1 | 4/2014 |
| JP | 2003-129803 A | 5/2003 |

OTHER PUBLICATIONS

Extended European Search Report and Opinion issued in connection with corresponding EP Application No. 16166165.7 on Sep. 28, 2016.

*Primary Examiner* — Gilbert Lee
(74) *Attorney, Agent, or Firm* — Sutherland Asbill & Brennan LLP (57) ABSTRACT

The present application provide a seal for use between components engine facing a high pressure cooling air flow and a hot gas path in a gas turbine. The seal may include a first shim, a second shim with an air exit hole, one or more middle layers positioned between the first shim and the second shim, and one or more cooling pathways extending through the middle layers for the high pressure cooling air flow to pass therethrough and exit via the air exit hole into the hot gas path.

20 Claims, 6 Drawing Sheets

(56) References Cited

U.S. PATENT DOCUMENTS

2014/0091531 A1    4/2014  Morgan et al.
2015/0098808 A1*  4/2015  Morgan ................. F01D 9/041
                                                                       415/173.3

* cited by examiner

SEALS WITH COOLING PATHWAYS AND METERED COOLING

TECHNICAL FIELD

The present application and resultant patent relate generally to gas turbine engines and more particularly relate to cooled seals and the like having cooling pathways extending therethrough for metered cooling.

BACKGROUND OF THE INVENTION

Generally described, turbo-machinery such as gas turbine engines and the like include a main gas flow path extending therethrough. Gas leakage, either out of the gas flow path or into the gas flow path, may lower overall gas turbine efficiency, increase fuel costs, and possibly increase emission levels. Secondary flows also may be used within the gas turbine engine to cool the various heated components. Specifically, cooling air may be extracted from the later stages of the compressor for use in cooling the heated components and for purging gaps and cavities between adjacent components. For example, seals may be placed between turbine components such as stators and the like to limit air leakage. These locations, however, may face very high temperatures and velocities that may lead to heavy oxidation and even seal failure. As firing temperatures increase, thermal loads on seals, such as those included in gas turbine engines, increase accordingly, resulting in reduced seal lifetime, reduced component lifetime, and/or increased seal and component wear.

SUMMARY OF THE INVENTION

The present application and the resultant patent thus provide a seal for use between components facing a high pressure cooling air flow and a hot gas path in a gas turbine engine. The seal may include a first shim, a second shim with a first cooling pathway, and a third shim, where the second shim is positioned in between the first shim and the third shim. The third shim may include an inner surface and an outer surface, a recessed slot extending partially into the outer surface, and a metering opening extending from the recessed slot to the inner surface.

The present application and the resultant patent further provide a method of cooling a seal positioned between components in a gas turbine engine. The method may include flowing high pressure cooling air about a first side of the seal, and drawing the high pressure cooling air through a first cooling pathway on a second side of the seal. The method may include drawing the high pressure cooling air through a second cooling pathway on a third side of the seal opposite the second side, and drawing the high pressure cooling air through a meter hole and a recessed slot about a fourth side of the seal opposite the first side into a hot gas path.

The present application and the resultant patent further provide a cooled laminate seal for use between components facing a high pressure cooling air flow and a hot gas path in a gas turbine engine. The cooled laminate seal may include a cool-side laminate with a first cooling cutout at a first edge surface of the cooled laminate seal. The cooled laminate seal may include a hot-side laminate with an outer surface, an inner surface, a recessed slot extending into the hot-side laminate having a depth measured from the outer surface, and a metering opening extending from the inner surface to the recessed slot. The cooled laminate seal may include a first middle laminate positioned in between the cool-side laminate and the hot-side laminate. The first middle laminate may include a second cooling cutout at the first edge surface of the cooled laminate seal, the second cooling cutout aligned with the first cooling cutout and extending through a thickness of the first middle laminate, the second cooling cutout forming a first cooling pathway extending from the first edge surface of the cooled laminate seal to a first cooling pathway end aligned with the metering opening of the hot-side laminate, such that cooling air can flow through the cooled laminate seal from the second cooling cutout to the recessed slot of the hot-side laminate.

These and other features and improvements of the present application and the resultant patent will become apparent to one of ordinary skill in the art upon review of the following detailed description when taken in conjunction with the several drawings and the appended claims.

DETAILED DESCRIPTION

Certain embodiments of the disclosure include seals contained by seal slots and/or positioned in between adjacent static or rotating gas turbine components. For example, seals may be positioned between adjacent arcuate nozzle and/or shroud components of gas turbines, or between components configured to rotate with respect to each other. Adjacent arcuate components may include outer shrouds, inner shrouds, nozzle blocks, and diaphragms of gas turbines. Between each adjacent pair of arcuate components is a space, such as a slash face gap, that permits the arcuate components to expand as the operation of the gas turbine forces the arcuate components to expand. Seal slots may be positioned in between the spaces to provide sealing. Seal slots may be configured to retain seals and may be dimensioned larger than the seals, so as to prevent binding and allow for thermal growth of the components. Seal slots may be defined on the sides of each arcuate component for receiving a seal in cooperation with an adjacent slot of an adjacent arcuate component. Seals may be placed in the slot to prevent leakage between the areas of the turbine on either side of the seal. These areas may include the main gas-flow path and secondary cooling flows.

In some embodiments of the disclosure, seals may be cooled laminate seals configured to conform to misaligned seal slots. Cooled seals, as described herein, may maintain or increase seal life at higher temperatures. Cooled seals may further generate constant or near-constant flow through cooling channels or pathways of the seal regardless of a location of the seal within the seal slot.

Figure 1:
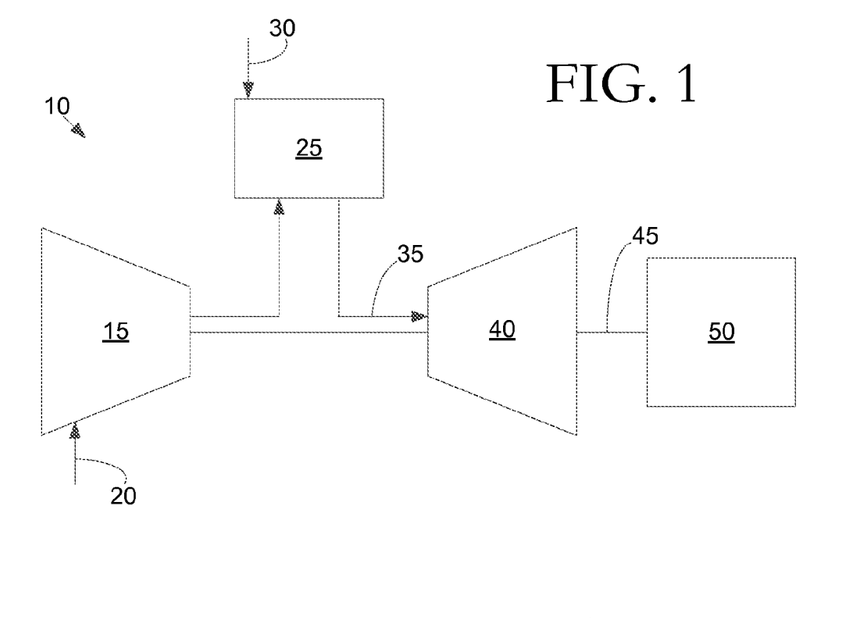
FIG. 1 is a schematic view of a gas turbine engine showing a compressor, combustor, and a turbine.

Referring now to the drawings, in which like numerals refer to like elements throughout the several views, FIG. 1 shows a schematic view of gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of combustors 25. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, various types of syngas, and/or other types of fuels. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2:
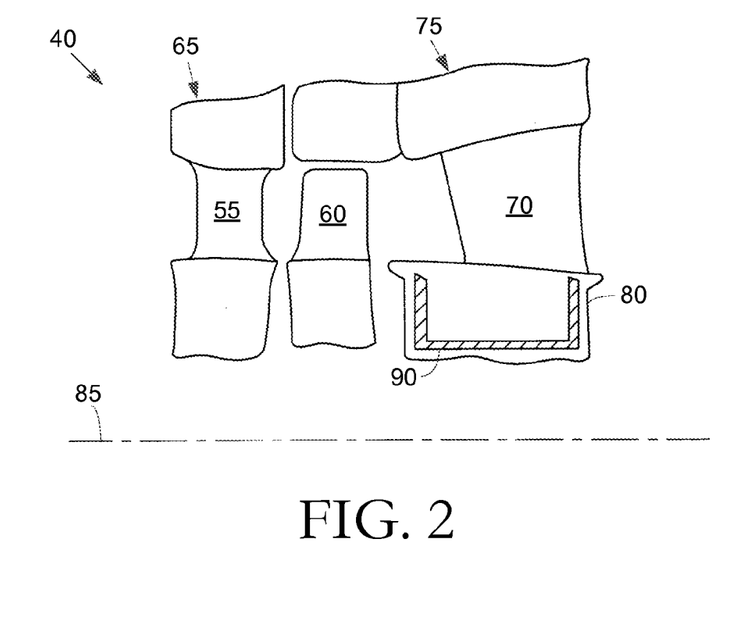
FIG. 2 is a partial side view of a turbine showing a number of components positioned along a hot gas path.

FIG. 2 shows a portion of the turbine 40. Generally described, the turbine 40 may include a first stage nozzle 55 and a first stage bucket 60 of a first stage 65. Also shown is a second stage nozzle 70 of a second stage 75. Any number of stages may be used herein. The nozzles 55, 70 may be positioned on a diaphragm 80. Any number of nozzles 70 and diaphragms 80 may be positioned circumferentially about an axis 85. A seal 90 may be positioned between each pair of adjacent diaphragms 80. The seals 90 may be used between adjacent diaphragms 80 or other turbine components so as to prevent the leakage of the cooling air flows 20 from the compressor 15 or elsewhere therethrough. As described above, the seals 90 may have many different configurations. Other types of sealing mechanisms also may be used. Other components and other configurations may be used herein.

Figure 3:
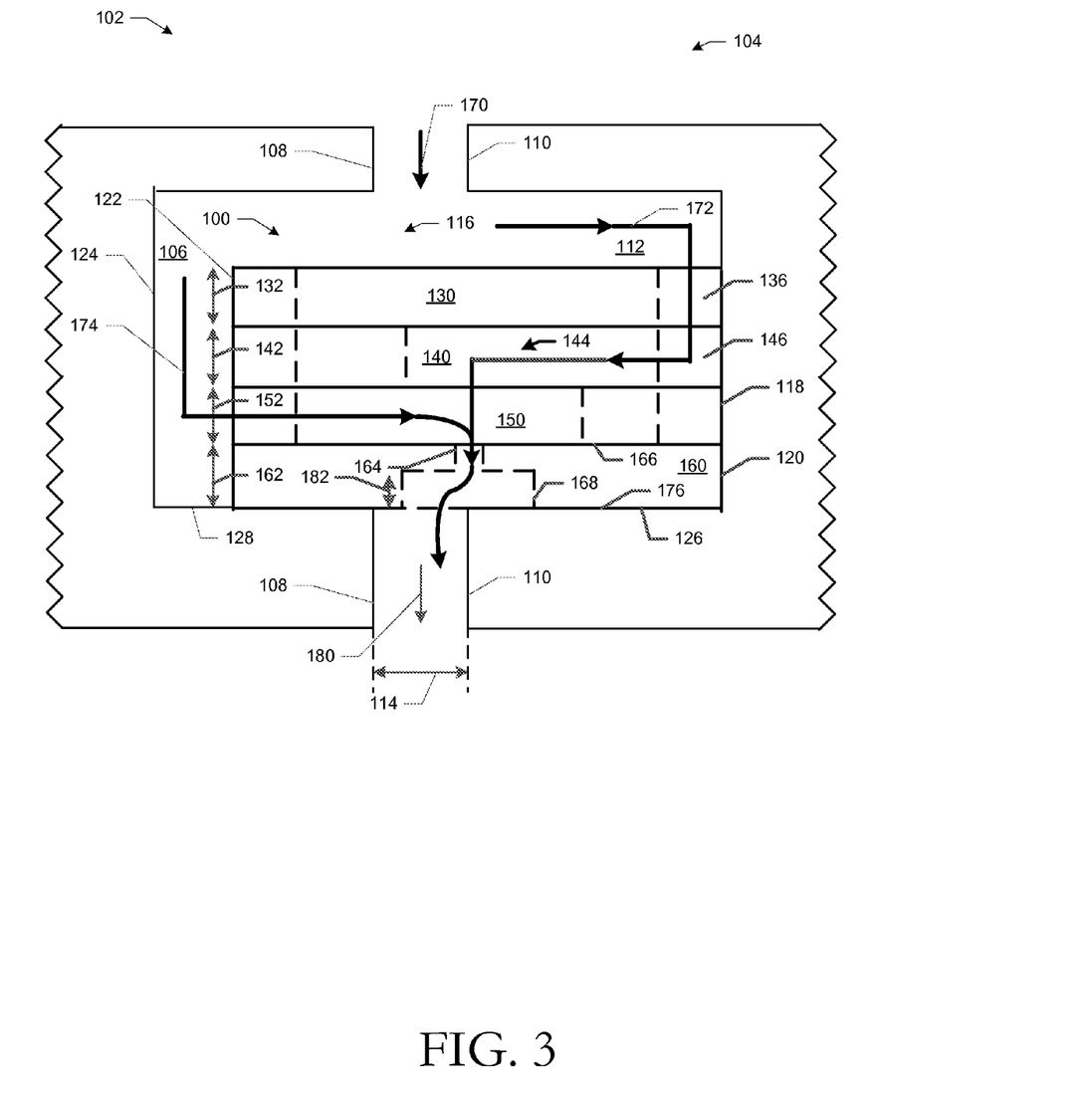
FIG. 3 is a cross-sectional view of a cooled seal positioned between adjacent turbine components in accordance with one or more embodiments.

FIG. 3 depicts an example of a cooled seal 100 in accordance with one or more embodiments described herein. The cooled seal 100 may be positioned in between two adjacent gas turbine components, such as a first gas turbine component 102 and a second gas turbine component 104. Specifically, the cooled seal 100 may be positioned between two adjacent slash faces of the first and second gas turbine components 102, 104 and may prevent leakage of cooling flow into a hot gas path. The first and second gas turbine components 102, 104 may be arcuate nozzle and/or shroud components, or in other embodiments may be other static or rotating gas turbine components. The first gas turbine component 102 may include a first seal slot 106 along a first slash face 108. The second gas turbine component 104 may include a second slash face 110 adjacent to the first slash face 108 and a second seal slot 112 that corresponds to the first seal slot 106. The cooled seal 100 may be positioned in the first seal slot 106 and the second seal slot 112 so as to form a seal between the first slash face 108 and the second slash face 110. In some embodiments, the cooled seal 100 may block or otherwise occlude a slash face gap 114 between the first slash face 108 and the second slash face 110.

Joint seal slots may be seal slots configured to house or retain a seal and may be formed by adjacent turbine components. For example, the first seal slot 106 and the second seal slot 112 may form a joint seal slot 116 in which the cooled seal 100 is positioned. The joint seal slot 116 may be larger than the cooled seal 110 in one or more dimensions so as to accommodate thermal growth of the turbine components or cooled seal 100 during operation. Accordingly, the cooled seal 100 may move freely in one or more directions within the joint seal slot 116. For example, as illustrated in FIG. 3, the cooled seal 100 may be positioned in the joint seal slot 116 such that a first edge surface 118 of the cooled seal 100 is in contact with a first wall 120 of the second seal slot 112. A second edge surface 122 of the cooled seal 100 may therefore be separated from a first wall 124 of the first seal slot 106. Similarly, as illustrated in FIG. 3, the cooled seal 100 may be in contact with a second wall 126, which may be a lower surface, of the second seal slot 112 and a second wall 128, which may be a lower surface, of the first seal slot 106. The cooled seal 100 may therefore be separated from upper surfaces, respectively, of the first and second seal slots 106, 112. The amount of separation and/or distance between the cooled seal and various walls or portions of the joint seal slot 116 may be based at least in part on differences in dimensions between the joint seal slot 116 and the cooled seal 100. Although described in this example as upper and lower surfaces, these terms are used only for relative orientation description and not absolute positions; the "upper" and "lower" surfaces may be the opposite in some embodiments.

The cooled seal 100 may include one or more layers. In some embodiments, the cooled seal 100 may include at least three layers. One or more layers may be formed from a shim, such as a metal shims, cloth shims, woven shims, or a combination thereof. One or more layers may be substantially planar. In the illustrated embodiment, the cooled seal 100 includes a first layer 130, a second layer 140, a third layer 150, and a fourth layer 160. The layers 130, 140, 150, 160 of the cooled seal 100 may form a sandwich-like arrangement, such that each layer has the same or substantially the same width, and respective edge surfaces of the layers 130, 140, 150, 160 form the first edge surface 118 and the second edge surface 122 of the cooled seal 100. Further, the first layer 130 may form a "top" or upper surface of the cooled seal 100, and the fourth layer 160 may form a "bottom" or lower surface of the cooled seal 100, or vice versa. The first layer 130 and the fourth layer 160 may form outer layers of the cooled seal 100.

One or more layers of the cooled seal 100 may have a uniform or equal thickness. For example, the first layer 130 may have a first thickness 132, the second layer 140 may have a second thickness 142, the third layer 150 may have a third thickness 152, and the fourth layer 160 may have a fourth thickness 162. One or more of the first, second, third, or fourth thicknesses 132, 142, 152, 162 may have an equal or different thickness. In the embodiment illustrated in FIG. 3, each layer 130, 140, 150, 160 of the cooled seal 100 may have the same thickness.

The cooled seal 100 may include one or more cooling channels or cooling pathways extending through one or more of the layers 130, 140, 150, 160 of the cooled seal 100, so as to cool the cooled seal 100. Cooling the cooled seal 100 may result in increased seal life and/or reduced fatigue of the cooled seal 100 and adjacent components. The cooling pathways of the cooled seal 100 may have starting points or first ends along the first edge surface 118 or the second edge surface 122 of the cooled seal 100, and may direct air or other fluid through the cooled seal 100 to an exit, which may be at the fourth layer 160 of the cooled seal 100, as described herein.

For example, in FIG. 3, a cooling flow 170 may pass between the first and second slash faces 108, 110 and enter the joint seal slot 116 in order to cool the first and/or second gas turbine components 102, 104 and/or the cooled seal 100. The cooling flow 130 may be a high pressure cooling flow. Upon entering the joint seal slot 116, the cooling flow 170 may impinge upon an outer surface, such as a top surface 134, of the first layer 130 of the cooling seal 100. The cooling flow 170 may be redirected about the cooling seal 100. In the illustrated embodiment, the cooling flow 170 may be redirected to a first cooling flow path 172 and a second cooling flow path 174.

As described herein, the first cooling flow path 172 may direct the cooling flow 170 through a first cooling cutout 136 in the first layer 130 and into a first cooling pathway 144 in the second layer 140. The first cooling pathway 144 may be formed from and/or adjacent to a second cooling cutout 146 in the second layer 140. For example, the second cooling cutout 146 may form a first end of the first cooling pathway 144 and the first cooling pathway 144 may extend from the first end to a second end, as described herein. The cooling flow 170 may continue along the first cooling path 172 through the first cooling pathway 144, through the third layer 150, and into a metering opening 164 of the fourth layer 160. The metering opening 164 may be positioned about an inner surface 166 of the fourth layer 160. In some embodiments, the metering opening 164 may be a metering hole having a diameter and a depth (e.g., for cylindrical holes) and/or having a length, width, and depth (e.g., for rectangular holes or other geometries). The metering opening 164 may be sized according to a desired flow rate of cooling flow 170 that passes through the fourth layer 160. The metering opening 164 may be in communication with a recessed slot 168. The recessed slot 168 may extend into the fourth layer 160 from an outer surface 176 and may have a depth less than or equal to the thickness 162 of the fourth layer 160. For example, the recessed slot 168 may have a depth 182 measured from the outer surface 176 of the fourth layer 160. The recessed slot 168 may be local to the metering opening 164 and may not extend the length of the cooled seal. The depth 182 may be less than or equal to the thickness 162 of the fourth layer 160. The depth 182 may be configured to achieve a certain flow rate or flow velocity of cooling flow 170 through the metering opening 164. The depth 182 may be a function of or otherwise related to a depth 184 of the metering opening 164 measured from the inner surface 166 of the fourth layer 160, or vice versa. For example, the depth 182 may be equal to the depth 184 of the metering opening 164 subtracted from the thickness 162 of the fourth layer 160. In some embodiments, the length or depth 164 of the metering opening 164 may be equal to or less than the thickness 164 of the fourth layer 160.

The second cooling path 174 may direct the cooling flow 170 through a third cooling cutout 156 in the third layer 150 and into a cooling channel or a second cooling pathway 154 in the third layer 150. The second cooling pathway 154 may be formed from and/or adjacent to the third cooling cutout 156 in the third layer 150. For example, the third cooling cutout 156 may form a first end or starting point of the second cooling pathway 154 and the second cooling pathway 154 may extend from the first end to a second end aligned with the second end of the first cooling pathway 144 and/or the metering opening 164, as described herein. The cooling flow 170 may continue along the second cooling path 174 through the second cooling pathway 154, and may merge with the first cooling path 172. The merged cooling flow 170 may pass through the metering opening 164 of the fourth layer 160.

The cooled seal 100 may move about the joint seal slot 116, resulting in a portion of the recessed slot 168 being blocked by a surface of the joint seal slot 116. Accordingly, the recessed slot 168 may be dimensioned such that a portion of the recessed slot 168 is unblocked and/or in communication with the slash face gap 114, so as to facilitate cooling flow 170 flowing through the cooled seal 100 to a hot gas path 180. In one example embodiment, the recessed slot 168 may have a length or width that is equal to or greater than half a width of the fourth layer 160. The hot gas path 180 may be relatively low pressure with respect to the cooling flow 170. As a result, the pressure differential may draw the cooling flow 170 along the first and second cooling paths 172, 174 into the cooled seal 100, thereby cooling the cooled seal 100. The cooling flow 170 may exit via the metering opening 164, which controls a flow rate through the cooled seal 100, and through the recessed slot 168 into the low pressure gas path 180. The cooling flow 170 thus cools the cooled seal 100 as it travels from the cooling cutouts to the metering opening 164. Other embodiments may include additional or fewer cooling cutouts, cooling pathways, metering openings, and/or recessed slots.

Figure 4:
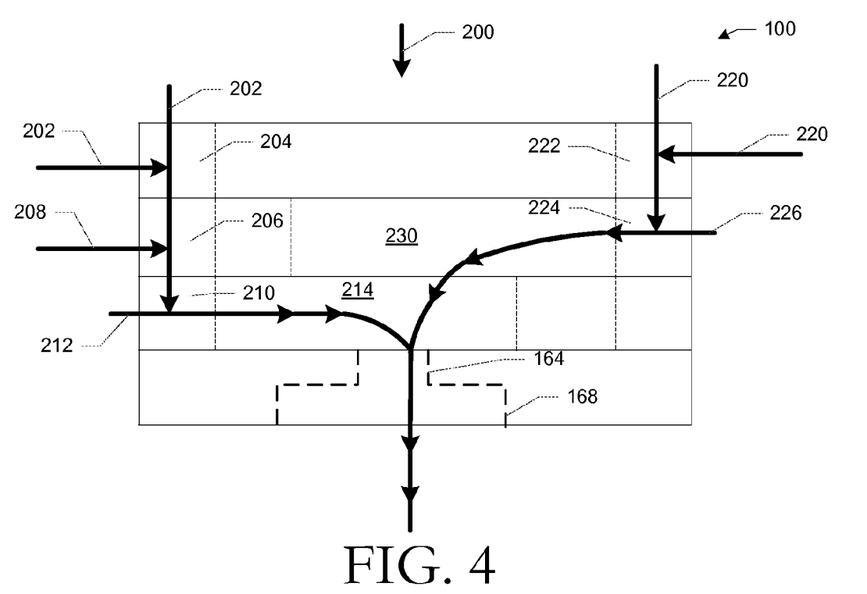
FIG. 4 is a schematic cross-sectional illustration of air flowing through a cooled seal in accordance with one or more embodiments.

Referring to FIG. 4, the cooled seal 100 of FIG. 3 is illustrated in isolated cross-sectional view with a number of cooling paths illustrated passing through the cooled seal 100. Embodiments of the cooled seal 100 may include some or all of the cooling paths illustrated in FIG. 4. In FIG. 3, cooling flow 200 may impinge on the first layer 130 of the cooled seal. The cooling flow 200 may enter the cooled seal 100 at a number of entry points or cooling cutouts, as described herein. Upon entering the cooled seal 100, the cooling flow 200 may flow through one or more cooling pathways and exit the cooled seal 100 through a metering opening, such as a metering hole, and/or a recessed slot. In FIG. 4, a first cooling path 202 may include the cooling flow 200 entering the cooled seal 100 at a first cooling cutout 204 of the first layer 130 and positioned at the first edge surface 122 of the cooled seal 100. The cooling flow 200 may enter the first cooling cutout 204 from the top surface 134 of the cooled seal 100, or from a side of the cooled seal 100, such as the first edge surface 122 of the cooled seal 100. The first cooling path 202 may continue through a second cooling cutout 206 formed from material removed from the second layer 140. The second cooling cutout 206 may be aligned with the first cooling cutout 204. Upon entering the second cooling cutout 206, the first cooling path 202 may merge with a second cooling path 208. The second cooling path 208 may include cooling flow 200 that enters the cooled seal 100 from a side surface, such as the first edge surface 122 of the cooled seal 100.

The merged first and second cooling paths 202, 208 may continue to flow through the second cooling cutout 206 into a third cooling cutout 210 formed from material removed from the third layer 150. The third cooling cutout 210 may be aligned with either or both the first cooling cutout 204 and the second cooling cutout 206. Upon entering the third cooling cutout 210, the first and second cooling paths 202, 208 may merge with a third cooling path 212. The third cooling path 212 may include cooling flow 200 that enters the cooled seal 100 from a side surface, such as the first edge surface 122 of the cooled seal 100.

The merged first, second, and third cooling paths 202, 208, 212 may flow through a first cooling channel or first cooling pathway 214. The first cooling pathway 214 may be formed in the third layer 150 and may extend from the first edge surface 122 of the cooled seal 100 into an interior portion of the cooled seal 100. The first cooling pathway 214 may extend to a second end that is aligned with the metering opening 164 of the fourth layer 160. Upon flowing through the first cooling pathway 214, the merged first, second, and third cooling paths 202, 208, 212 may flow through the metering opening 164 and through the recessed slot 168 to exit the cooled seal 100.

The cooling flow 200 may also flow through the cooled seal 100 at a fourth cooling path 220. The fourth cooling path 220 may include the cooling flow 200 entering the cooled seal 100 at a fourth cooling cutout 222 of the first layer 130. The fourth cooling cutout 222 may be positioned opposite from and/or aligned with the first cooling cutout 204 of the first layer 130. For example, the fourth cooling cutout 222 may be positioned at the second edge surface 118 opposite the first edge surface 122. The cooling flow 200 may enter the fourth cooling cutout 222 from the top surface 134 of the cooled seal 100, or from the second edge surface 118 of the cooled seal 100. The fourth cooling path 220 may continue through a fifth cooling cutout 224 formed from material removed from the second layer 140. The fifth cooling cutout 224 may be aligned with the fourth cooling cutout 222 and may be opposite from and/or aligned with the second cooling cutout 206 of the second layer 140. Upon entering the fifth cooling cutout 224, the fourth cooling path 220 may merge with a fifth cooling path 226. The fifth cooling path 226 may include cooling flow 200 that enters the cooled seal 100 from the second edge surface 118 of the cooled seal 100.

The merged fourth and fifth cooling paths 220, 226 may continue to flow through the fifth cooling cutout 224 into a second cooling channel or second cooling pathway 230. The second cooling pathway 230 may be formed in the second layer 140 and may extend from the second edge surface 118 of the cooled seal 100 into an interior portion of the cooled seal 100. The second cooling pathway 230 may extend to a second end that is aligned with the metering opening 164 of the fourth layer 160 and/or the second end of the first cooling pathway 214. Upon flowing through the second cooling pathway 230, the merged fourth and fifth cooling paths 220, 226 may flow through the second end of the first cooling pathway 214, through the metering opening 164, and through the recessed slot 168 to exit the cooled seal 100.

Depending on the position of the cooled seal 100 in a seal slot, some cooling paths may be blocked, while other cooling paths remain open. Accordingly, cooling flow 200 may pass through different cooling paths at different times, depending on which cooling flows are open or otherwise unblocked and/or a position of the cooled seal 100 in a seal slot. In embodiments with high pressure cooling flow, the pressure differential between the high pressure cooling air and the lower pressure gas path thus draws the high pressure cooling air into the cooled seal 100. The high pressure cooling air thus cools the cooled seal 100 as it travels through the cooled seal 100. Other components and other configurations may be used herein.

Figure 5:
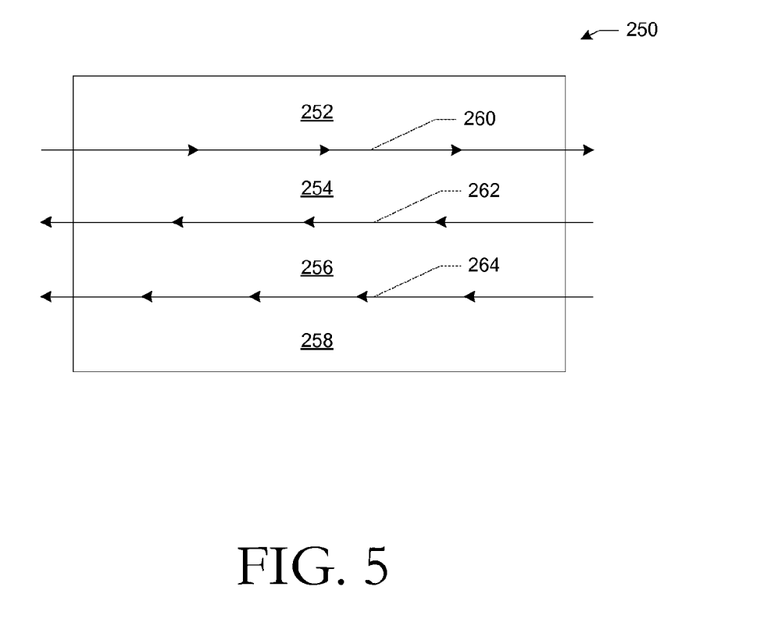
FIG. 5 is a schematic cross-sectional illustration of air flowing between adjacent layers of a cooled seal in accordance with one or more embodiments.

Referring to FIG. 5, an embodiment of a cooled seal 250 as described herein is illustrated. The cooled seal 250 may be formed of at least three layers, such as two outer layers and one or more middle layers. Cooled seals, as described herein, may be formed with methods such as lamination (e.g., laminate seal layers), casting (e.g., casted as one-piece seals), welding, core print outs, and other manufacturing methods. For example, the cooled seal 250 may have a top layer 252, a first middle layer 254, a second middle layer 256, and a bottom layer 258. The terms "bottom," "top," "side," "end," "first," "second" and the like are used for purposes of relative orientation only and not as an absolute position. The top layer 252 may be a cool-side layer and may be in contact with cooling flow. The bottom layer 258 may be a hot-side layer and may be in contact with a hot gas path. The cooled seal 250 may be a laminate seal or may include one or more laminated layers forming a stacked seal. For example, each layer may be laminated to adjacent layers. As a result of the lamination, cooling flow may pass through gaps in adjacent layers. For example, cooling flow may pass in direction 260 in between the top layer 252 and the first middle layer 254. Cooling flow may pass in direction 262 in between the first middle layer 254 and the second middle layer 256. Cooling flow may pass in direction 264 in between the second middle layer 256 and the bottom layer 258. While directions 262 and 264 are depicted as being aligned, cooling flow may flow in any direction between the layers of the cooled seal 250. Some or all of the cooling flow directions may be aligned or different.

Figure 6:
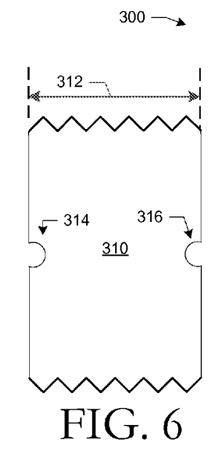
FIGS. 6-11 schematically illustrate partial top views and a cross-sectional view of one or more layers of a cooled seal in accordance with one or more embodiments.

Referring to FIGS. 6-11, individual layers of a cooled seal as described herein are depicted. Referring first to FIG. 6, a first layer 310 of a cooled seal 300 is depicted. The first layer 310 may be an outer layer or middle layer of the cooled seal 300. The first layer 310 may be a shim and may have a first width 312. The first layer 310 may have a first cooling cutout 314 formed from material removed from the first layer 310. The first layer 310 may have a corresponding second cooling cutout 316 opposite from, and aligned with, the first cooling cutout 314. The first and second cooling cutouts 314, 316 may have semicircular geometries, as illustrated, or may have alternate geometries. In some embodiments, the first and second cooling cutouts 314, 316 may have different geometries.

Figure 7:
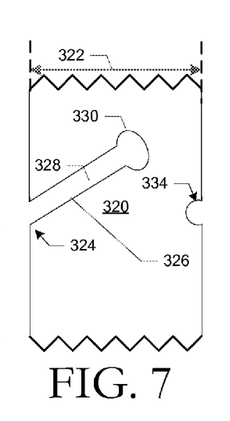

FIG. 7 depicts a second layer 320 of the cooled seal 300. The second layer 320 may be an outer layer or a middle layer of the cooled seal 300, and may be positioned adjacent to the first layer 310. The second layer 320 may be a shim and may have a second width 322. The second width 322 may be equal to the first width 312. The second layer 320 may have a third cooling cutout 324 formed from material removed from the second layer 320. The third cooling cutout 324 may form a first end or a starting end of a first cooling pathway 326 formed in the second layer 320. The third cooling cutout 324 may have the same or different dimensions than the first cooling pathway 326. In some embodiments, the third cooling cutout 324 may be larger than the first cooling pathway 326 and may blend into the first cooling pathway 326. The first cooling pathway 326 may have a width 328 that is consistent or variable over a length of the first cooling pathway 326. The first cooling pathway 326 may extend to a second end 330. The second end 330 may be dimensioned equal to the width 328, or may be larger, as shown in FIG. 7. In some embodiments, the second end 330 may be dimensioned equal to the metering opening of the cooled seal 300. The second end 330 may be aligned with the metering opening of the cooled seal 300, and may have a suitable geometry, such as, but not limited to, circular or rectangular. As illustrated, the first cooling pathway 326 may be angled with respect to one or more edges of the second layer 320. In some embodiments, the first cooling pathway 326 may be aligned with one or more edges of the second layer 320. The angle of the first cooling pathway 326 may affect cooling flow rate and direction through the cooled seal 300. The second layer 320 may have a corresponding fourth cooling cutout 332 opposite from, and aligned with, the third cooling cutout 324. The fourth cooling cutout 332 may be aligned with the second cooling cutout 316 of the first layer 310.

Figure 8:
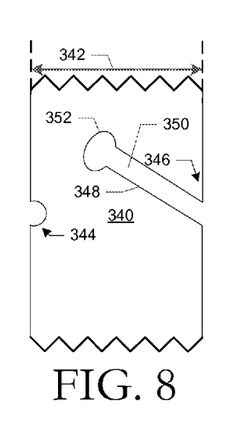

FIG. 8 depicts a third layer 340 of the cooled seal 300. The third layer 340 may be an outer layer or a middle layer of the cooled seal 300, and may be positioned adjacent to the second layer 320. The third layer 340 may be a shim and may have a third width 342. The third width 342 may be equal to the first width 312 and/or the second width 322. The third layer 340 may have a fifth cooling cutout 344 formed from material removed from the third layer 340. The fifth cooling cutout 344 may be aligned with the first and/or third cooling cutouts 314, 324 of the respective first and second layers 310, 320, and may have the same dimensions and/or geometry. The third layer 340 may have a corresponding sixth cooling cutout 346 opposite from, and aligned with, the fifth cooling cutout 344. The sixth cooling cutout 346 may be aligned with the second cooling cutout 316 of the first layer 310 and/or the fourth cooling cutout 332 of the second layer 320. The sixth cooling cutout 346 may form a first end or a starting end of a second cooling pathway 348 formed in the third layer 340. The sixth cooling cutout 346 may have the same or different dimensions than the second cooling pathway 348. In some embodiments, the sixth cooling cutout 346 may be larger than the second cooling pathway 348 and may blend into the second cooling pathway 348. The second cooling pathway 348 may have a width 350 that is consistent or variable over a length of the second cooling pathway 348. The second cooling pathway 348 may be dimensioned the same as the first cooling pathway 326 of the second layer 320, and in some embodiments, may form a mirror-image of the first cooling pathway 326.

The second cooling pathway 348 may extend to a second end 352 that is aligned with the second end 330 of the first cooling pathway 326. The second end 352 may be dimensioned equal to the width 350 of the second cooling pathway 348, or may be larger, as shown in FIG. 8. In some embodiments, the second end 352 may be dimensioned equal to the metering opening of the cooled seal 300. The second end 352 may be aligned with the metering opening of the cooled seal 300, and may have a suitable geometry, such as circular or rectangular. As illustrated, the second cooling pathway 348 may be angled with respect to one or more edges of the third layer 340 and/or the first cooling pathway 326. For example, the second cooling pathway 348 may be positioned at an acute angle with respect to one or more edges and/or the first cooling pathway 326. In some embodiments, the second cooling pathway 348 may be aligned with one or more edges of the third layer 340 and/or the first cooling pathway 326.

Figure 9:
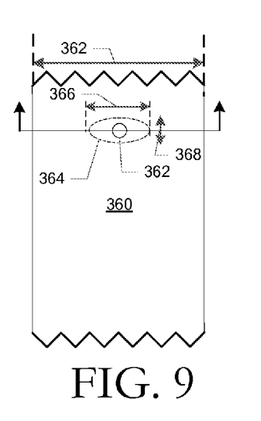

FIG. 9 depicts a fourth layer 360 of a cooled seal 300. The fourth layer 360 may be an outer layer or middle layer of the cooled seal 300. The fourth layer 360 may be a shim and may have a fourth width 362. The fourth layer 360 may be positioned adjacent to the third layer 340 and may the fourth width 362 may be equal to the third width 342. The fourth layer 360 may have a metering opening 362 formed from material removed from the fourth layer 360. The metering opening 362 may extend partially into the fourth layer 360 and may be in communication with a recessed slot 364 formed at an opposite side of the fourth layer 360. The metering opening 362 may be dimensioned such that the metering opening 362 is smaller than the recessed slot 364. The recessed slot 364 may have any suitable geometry, such as rectangular, elliptical, oval, or another geometry. The recessed slot 364 may have a width 366 that may be equal to or greater than half of the width 362 of the fourth layer 360. The recessed slot 364 may have a length 368 that is equal to or greater than a diameter or length of the metering opening 362.

Figures 10, 11:
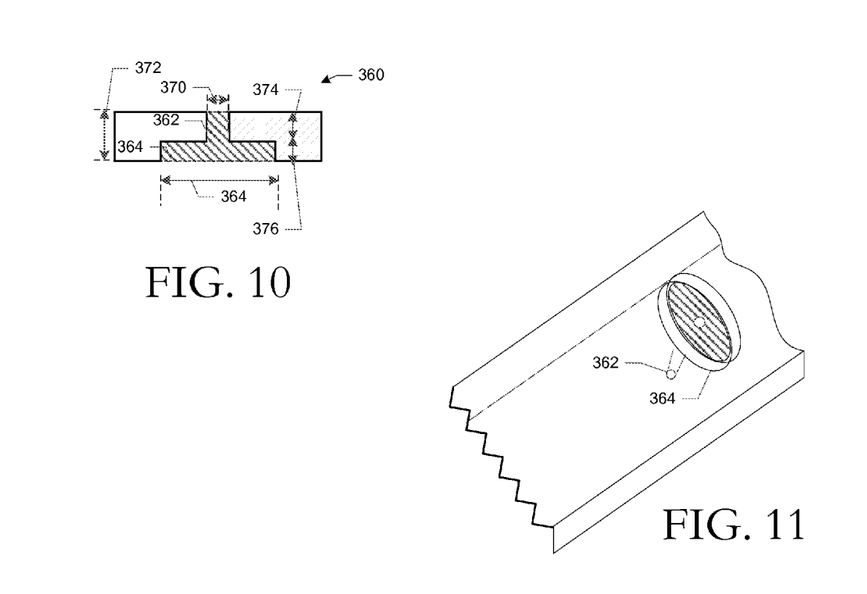

FIGS. 10 and 11 illustrate a cross-sectional view and perspective view of the fourth layer 360. The fourth layer 360 may have a thickness 372. The recessed slot 364 may have a depth 374 that is equal to or less than the thickness 372. The metering opening 362 may have a depth 376 that is less than or equal to the thickness 372. In some embodiments, the depth 374 of the recessed slot 364 and the depth 376 of the metering opening 362 may equal the thickness 372 of the fourth layer 360. The metering opening 362 may have a width 370 that is less than the width 366 of the recessed slot 364. The dimension of the metering opening 362 may determine the flow rate of cooling flow that passes through the cooled seal 300, and, in combination with the recessed slot 364, may provide consistent or near consistent cooling flow rates through the cooled seal 300.

Figure 12:
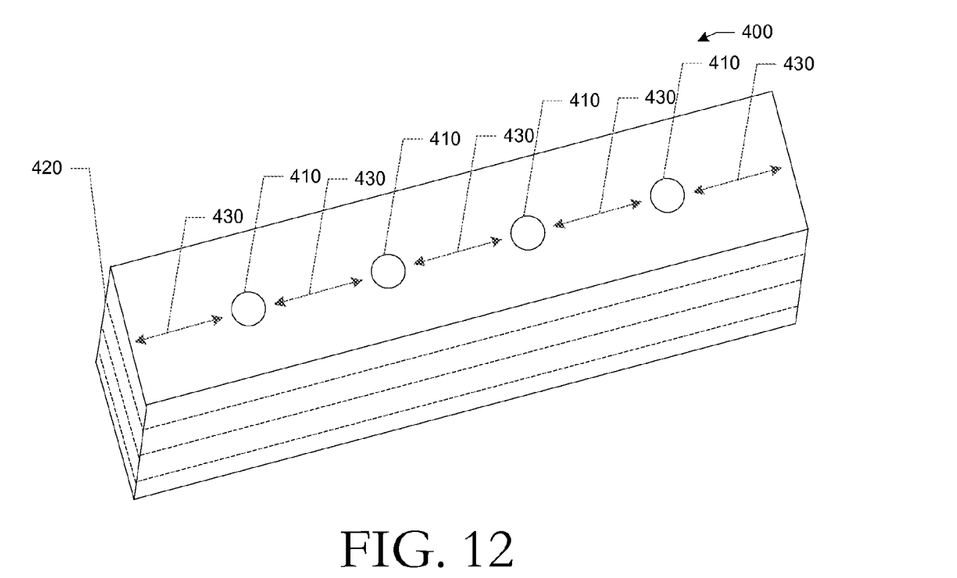
FIGS. 12-13 illustrate a partial perspective view and end view of a cooled seal in accordance with one or more embodiments.
Figure 13:
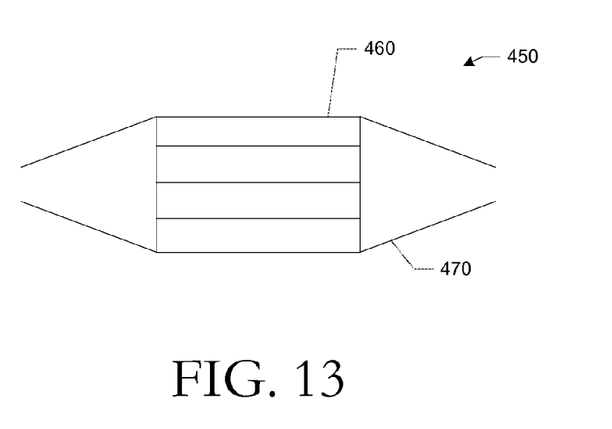

Referring to FIGS. 12 and 13, another embodiment of a cooled seal 400 is illustrated in perspective view in FIG. 12. The cooled seal 400 may include a number of layers sandwiched to form the cooled seal 400. The cooled seal 400 may be a bar-like seal, where each layer has an equal width. The cooled seal 400 may include one or more spot welds 410 spaced a distance 430 apart. The spot welds 410 may be evenly spaced or may be spaced at different intervals. For example, the spot welds 410 may be spaced equal distances from edges 420, 440 of the cooled seal 400.

FIG. 13 illustrates another embodiment 450 of the cooled seal 400. The cooled seal 450 may include bent outer layers. For example, the cooled seal 450 may include a first bent outer layer 460 that has equal bends on both lateral edges so as to form a partially enclosed edge. Similarly, the cooled seal 450 may include a second bent outer layer 470 that has equal bends on both lateral edges so as to form a partially enclosed edge with the first bent outer layer 460. The layers of the cooled seal 450 may be made out of a high temperature resistant material such as stainless steel, nickel-based alloys, and the like. Other types of materials also may be used herein. Other embodiments may include high temperature adhesives, high strength fasteners, and other types of fastening means.

Figure 14:
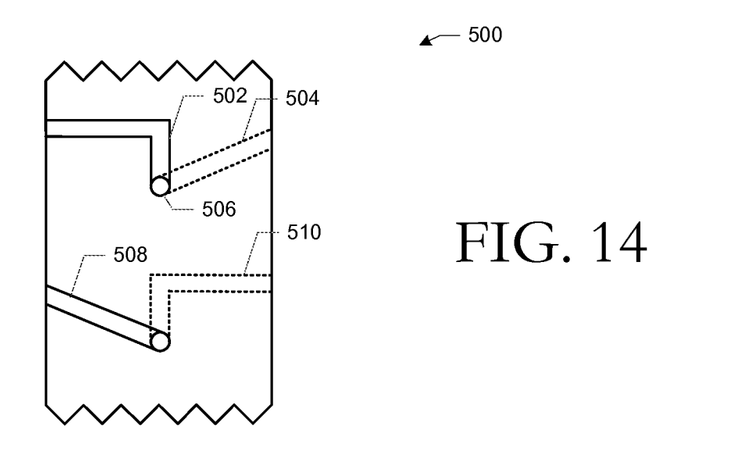
FIGS. 14-16 illustrate top views of example layers of a cooled seal in accordance with one or more embodiments.
Figure 15:
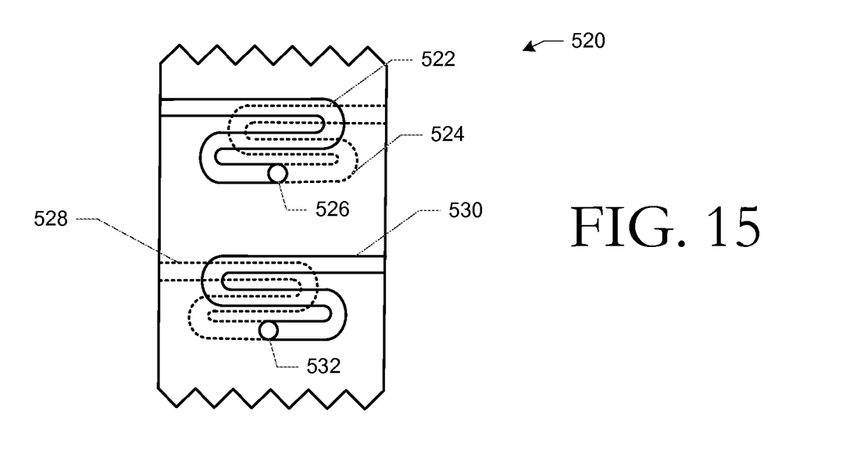
Figure 16:
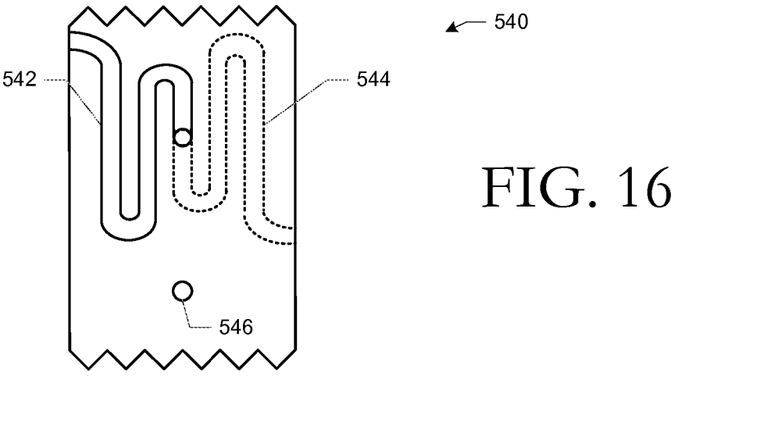

Referring to FIGS. 14-16, additional embodiments of one or more layers of a cooled seal are illustrated. Cooling pathways or cooling channels may have various configurations as described herein. Referring to FIG. 14, a cooled seal 500 may have a first cooling path 502 forming a right angle at a first layer, and may be in fluid communication with a second cooling path 504 that is angled with respect to the first cooling path 502 via cooling hole 506. The cooled seal 500 may include a third cooling path 508 on the same layer as the first cooling path 502 that is angled similar to, or the same as, the second cooling path 504. The cooled seal 500 may include a fourth cooling path 510 that forms a right angle on the second layer, similar to or the same as the first cooling path 502. In some embodiments, one or more layers of the cooled seal 500 may be mirror images of each other.

FIG. 15 illustrates a cooled seal 520 with a first serpentine cooling path 522 on a first layer in fluid communication with a second serpentine cooling path 524 on a second layer via cooling hole 526. The first serpentine cooling path 522 may be a mirror image of the second serpentine cooling path 524. The cooled seal 520 may include a third serpentine cooling path 528 on the second layer that may be similar to the first serpentine cooling path 522, in fluid communication with a fourth serpentine cooling path 530 that may be similar to the second serpentine cooling path 522 on the first layer via cooling hole 532. The serpentine cooling paths may be mirror images of each other on the respective layers of the cooled seal 520.

FIG. 16 illustrates another embodiment of a cooled seal 540. The cooled seal 540 may include a first serpentine path 542 on a first layer and a corresponding second serpentine cooling path 544 on a second layer that exhausts to an opposite side in fluid communication via a cooling hole. The cooled seal 540 may also include a cooling hole distanced from the first and second serpentine paths 542, 544 extending through each layer of the cooled seal 540.

The cooled seals described herein thus provide consistent or near consistent cooling flow rates through the cooled seals, resulting in improved cooling and extended seal life. Moreover, the cooled seals described herein provide improved cooling with reduced secondary flows, higher overall engine efficiency, and a reduced heat rate. Different configurations of the cooled seals may be used together herein. Embodiments of the disclosure may provide a constant cooling flow regardless of seal location within the seal slot and independent of slash face gap size or seal location within the seal slot. Other types of sealing locations also may be used.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A seal for use between components facing a high pressure cooling air flow and a hot gas path in a gas turbine engine comprising:
   a first shim comprising a first cooling pathway formed by a first cooling cutout;
   a second shim comprising a second cooling pathway formed by a second cooling cutout, wherein the second cooling pathway has a different orientation than the first cooling pathway; and
   a third shim having a first length, wherein the second shim is positioned in between the first shim and the third shim, the third shim comprising:
      an inner surface and an outer surface;
      a recessed slot extending partially into the outer surface, wherein the recessed slot has a second length and is sized to maintain fluid communication with the hot gas path; and
      a metering opening extending from the recessed slot to the inner surface;
   wherein the seal is movably positioned in a slot of the gas turbine engine, the slot having a third length, wherein the second length is greater than a difference between the third length and the first length.

2. The seal of claim 1, wherein the recessed slot extends a portion of a thickness of the third shim.

3. The seal of claim 2, wherein the metering opening is smaller than the recessed slot.

4. The seal of claim 1, wherein the second cooling pathway extends from a first end at a first edge surface of the seal to a second end aligned with the metering opening of the third shim, such that cooling air can flow from the first end of the second cooling pathway to the metering opening.

5. The seal of claim 4, wherein the first cooling cutout extends from the first edge surface and is in communication with the first end of the second cooling pathway of the second shim.

6. The seal of claim 5, wherein:
   the first cooling cutout is positioned at a second edge surface of the seal opposite the first edge surface; and
   the second shim comprises a third cooling cutout at the second edge surface of the seal.

7. The seal of claim 6, further comprising a fourth shim positioned in between the first shim and the second shim, the fourth shim comprising:
   a third cooling pathway extending from a third end at the second edge surface of the seal to a fourth end aligned with the metering opening of the third shim, such that cooling air can flow from the third end of the third cooling pathway to the metering opening.

8. The seal of claim 7, wherein the second cooling pathway is positioned at an acute angle with respect to the third cooling pathway.

9. The seal of claim 1, wherein the recessed slot extends across more than half a width of the third shim.

10. The seal of claim 1, wherein the seal is positioned in between two adjacent static components of the gas turbine engine.

11. The seal of claim 1, further comprising a plurality of metering openings in communication with the recessed slot.

12. The seal of claim 1, wherein the first shim and the third shim have uniform thicknesses.

13. The seal of claim 1, wherein the seal is a laminate seal.

14. The seal of claim 1, further comprising a plurality of shims positioned about the second shim, such that the plurality of shims and the second shim form middle layers positioned between the first shim and the third shim.

15. A method of cooling a seal movably positioned between components in a gas turbine engine, comprising:
   flowing high pressure cooling air about a first side of the seal;
   drawing the high pressure cooling air through a first cooling pathway on a second side of the seal;
   drawing the high pressure cooling air through a second cooling pathway on a third side of the seal opposite the second side; and
   drawing the high pressure cooling air through a plurality of meter holes in communication with a recessed slot about a fourth side of the seal opposite the first side into a hot gas path, wherein the recessed slot is sized to maintain fluid communication with the hot gas path.

16. A cooled laminate seal for use between components facing a high pressure cooling air flow and a hot gas path in a gas turbine engine comprising:
   a cool-side laminate comprising a first cooling cutout at a first edge surface of the cooled laminate seal;
   a hot-side laminate comprising:
      an outer surface;
      an inner surface;
      a recessed slot extending into the hot-side laminate having a depth measured from the outer surface, wherein the recessed slot is sized to maintain fluid communication with the hot gas path; and a plurality of metering openings extending from the inner surface to the recessed slot; and a first middle laminate positioned in between the cool-side laminate and the hot-side laminate, the first middle laminate comprising:

a second cooling cutout at the first edge surface of the cooled laminate seal, the second cooling cutout aligned with the first cooling cutout and extending through a thickness of the first middle laminate, the second cooling cutout forming a first cooling pathway extending from the first edge surface of the cooled laminate seal to a first cooling pathway end aligned with the metering opening of the hot-side laminate, such that cooling air can flow through the cooled laminate seal from the second cooling cutout to the recessed slot of the hot-side laminate;

wherein the cooled laminate seal is movably positioned in a slot of the gas turbine engine.

17. The cooled laminate seal of claim 16, further comprising:

a second middle laminate positioned in between the cool-side laminate and the first middle laminate comprising a third cooling cutout at a second edge surface of the cooled laminate seal opposite the first edge surface;

wherein the third cooling cutout forms a second cooling pathway extending from the second edge surface of the cooled laminate seal to a second cooling pathway end aligned with the first cooling pathway end and the metering opening of the hot-side laminate, such that cooling air can flow through the cooled laminate seal from the third cooling cutout to the recessed slot of the hot-side laminate.

18. The cooled laminate seal of claim 17, wherein the first cooling pathway is positioned at an acute angle with respect to the second cooling pathway.

19. The cooled laminate seal of claim 17, wherein the cool-side laminate comprises a fourth cooling cutout at the second edge surface of the cooled laminate seal aligned with the third cooling cutout of the second middle laminate.

20. The cooled laminate seal of claim 19, wherein:

the first middle laminate comprises a fifth cooling cutout aligned with the third cooling cutout and the fourth cooling cutout at the second edge surface of the cooled laminate seal; and the second middle laminate comprises a sixth cooling cutout aligned with the first cooling cutout and the second cooling cutout at the first edge surface of the cooled laminate seal.

* * * * *